US008375526B2

(12) United States Patent
Everett

(10) Patent No.: US 8,375,526 B2
(45) Date of Patent: Feb. 19, 2013

(54) ROPE MANAGEMENT DEVICE

(76) Inventor: Perry L. Everett, West Linn, OR (US)

(*) Notice: Subject to any disclaimer, the term of this patent is extended or adjusted under 35 U.S.C. 154(b) by 45 days.

(21) Appl. No.: 12/799,425

(22) Filed: Apr. 26, 2010

(65) Prior Publication Data

US 2011/0258815 A1 Oct. 27, 2011

(51) Int. Cl.
*F16G 11/10* (2006.01)

(52) U.S. Cl. ........ 24/132 R; 24/133; 24/134 R; 182/192

(58) Field of Classification Search ................ 24/134 R, 24/134 KA, 134 L, 132 AA, 132 R, 133; 182/5, 192, 193, 241; 188/65.1–65.5
See application file for complete search history.

(56) References Cited

U.S. PATENT DOCUMENTS 887,344 A * 5/1908 Nelson ......................... 188/65.1
974,929 A * 11/1910 Smith .......................... 188/65.5
1,650,281 A * 11/1927 Knudson ...................... 188/65.1
2,976,955 A * 3/1961 Huber .......................... 188/65.1
3,112,816 A * 12/1963 Halford ......................... 254/391
5,850,893 A * 12/1998 Hede et al. ..................... 182/193
6,446,753 B1 * 9/2002 Novak .......................... 182/193
6,732,833 B2 * 5/2004 Rogelja ............................ 182/5
6,899,203 B1 * 5/2005 Golden et al. ............... 188/65.4
6,902,031 B2 * 6/2005 Ador ................................ 182/5
7,108,099 B2 * 9/2006 Ador ................................ 182/5
7,533,871 B1 * 5/2009 Everett et al. ................. 254/408

* cited by examiner

*Primary Examiner* — Robert J Sandy
*Assistant Examiner* — Abigail E Morrell
(74) *Attorney, Agent, or Firm* — Edward E. Roberts

(57) ABSTRACT

A rope management device includes features allowing for transition from a rope clamping position to a rope unclamped position when under load. Included is a teeter bar having a pivot axis allowing for application of friction on a section of rope to hold a load in place and then when rope is pulled through the device the load is maintained while allowing the teeter bar to pivot to eliminate friction on the rope.

5 Claims, 4 Drawing Sheets

ROPE MANAGEMENT DEVICE

CLAIM FOR BENEFIT OF EARLIER FILING DATE

This application claims the benefit of U.S. Provisional Application No. 61/214,287 filed on 23 Apr. 2009 and entitled "ROPE MANAGEMENT DEVICE". This utility application has the same subject matter and title as the aforesaid Provisional Application.

BACKGROUND

The background of the invention will be discussed in two parts.

1. Field of the Invention

The present invention relates to a rope management device and in particular to a device for ascending and descending a rope without the assistance of a belayer and that can be changed from a clamping device to an unclamping device under load.

2. Related Art

In U.S. Pat. No. 6,899,203 issued on 31 May 2005 to Perry L. Everett et al., and in U.S. Pat. No. 7,533,871 issued on 19 May 2009 to Perry L. Everett et al., there is shown and described rope climbing apparatus that provides a simple and convenient way to ascend and descend a rope without using a belayer. The present invention provides an easier and smoother transition from a rope clamping position to a rope unclamping position, thus conveniently providing an even more effective rope climbing device.

SUMMARY

A rope management device is provided that includes features allowing for transition from a rope clamping position to a rope unclamped position when under load. Included is a teeter bar having a pivot axis allowing for application of friction on a section of rope to hold a load in place and then when rope is pulled through the device the load is transferred within the device and allows the teeter bar to pivot about another axis to eliminate friction between the rope and clamping surfaces. The device can function with a double rope technique system as well as a belay device.

DRAWINGS

LIST OF REFERENCE NUMERALS IN THE APPLICATION

Figure 1:
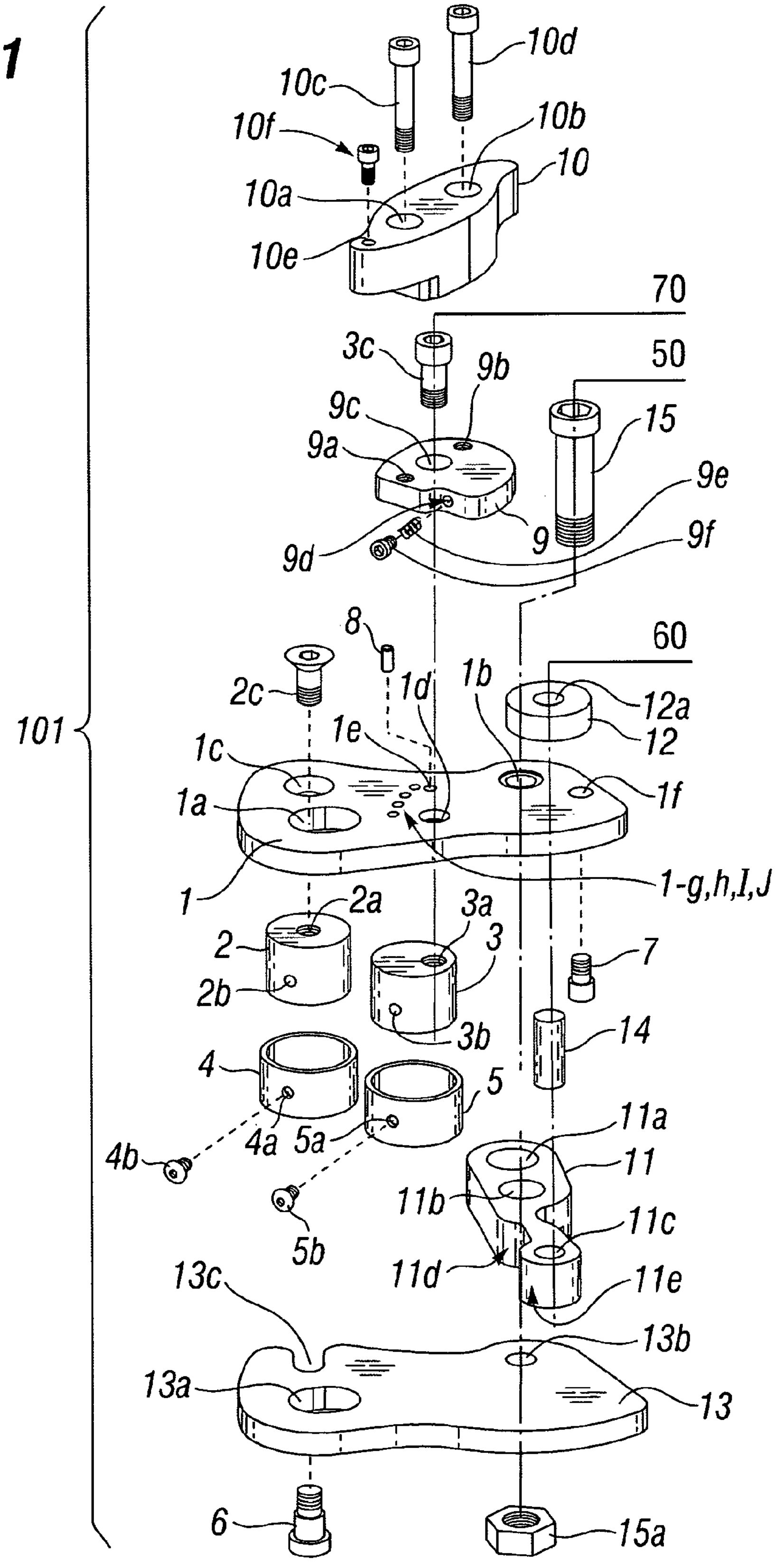
FIG. 1 is an exploded perspective diagram illustrating the manner in which the components of the present invention are assembled in relationship to each other according to an embodiment of the invention.

A listing of the reference numerals, in which like reference numerals refer to like elements in the several views, with a brief description of their function, is as follows:

101. General designation of the device of the invention
1. Base plate
1*a*. Base plate attachment hole
1*b*. Base plate pivot hole
1*c*. Base plate fastener hole for fastener 2*c*
1*d*. Base plate fastener hole for fastener 3*c*
1*e*. Base plate hole for stop 8
1*f*. Base plate hole for stop 7
1*g*. Base plate fastener hole for stop bolt 10*f*
1*h*. Base plate fastener hole for stop bolt 10*f*
1*i*. Base plate fastener hole for stop bolt 10*f*
1*j*. Base plate fastener hole for stop bolt 10*f*
2. Bollard for attachment to base plate 1 by means of fastener 2*c*
2*a*. Threaded fastener hole for receiving fastener 2*c* and stop 6
2*b*. Fastener hole for receiving fastener 4*b*
2*c*. Threaded fastener for connection through fastener hole 1*c* to bollard 2
3. Bollard for attachment to base plate 1 by means of fastener 3*c*
3*a*. Threaded fastener hole for receiving fastener 3*c*
3*b*. Fastener hole for receiving fastener 5*b*
3*c*. Fastener for connection through pivot hole 9*c* and base plate hole 1*d* to bollard 3
4. Wear sleeve for receiving bollard 2
4*a*. Fastener hole for receiving fastener 4*b*
4*b*. Threaded fastener for connection through fastener hole 4*a* of wear sleeve 4 into fastener hole 2*b* of bollard 2
5. Wear sleeve for receiving bollard 3
5*a*. Fastener hole for receiving fastener 5*b*
5*b*. Threaded fastener for connection through fastener hole 5*a* of wear sleeve 5 into fastener hole 3*b* of bollard 3
6. Stop for threading into hole 2*a* of bollard 2
7. Stop for threading into hole 1*f* of base plate 1
8. Stop for insertion into hole 1*e* of base plate 1
9. Cam
9*a*. Cam fastener hole
9*b*. Cam fastener hole
9*c*. Cam pivot hole
9*d*. Fastener hole
9*e*. Spring
9*f*. Control screw
10. Handle
10*a*. Handle fastener hole for receiving bolt 10*c*
10*b*. Handle fastener hole for receiving bolt 10*d*
10*c*. Handle fastener bolt
10*d*. Handle fastener bolt
10*e*. Fastener hole
10*f*. Governor stop bolt
11. Teeter bar
11*a*. Teeter bar attachment hole
11*b*. Teeter bar pivot hole
11*c*. Teeter bar fastener hole
11*d*. General designation for teeter bar friction brake
11*e*. General designation for teeter bar fairlead
12. Bearing
12*a*. Bearing fastener hole 13. Access plate
13*a*. Access plate attachment hole
13*b*. Access plate pivot hole
13*c*. General designation for access plate catch
14. Fastener for insertion into fairlead fastener hole 11*c*
15. Fastener for insertion through pivot holes 1*b* and 13*b*, abuts friction brake 11*d*
15*a*. Nut for receiving fastener 15 on access plate 13

DESCRIPTION

The present invention provides a different embodiment of the disclosures of U.S. Pat. No. 6,899,203 issued on 31 May 2005 to Perry L. Everett et al. and of U.S. Pat. No. 7,533,871 issued on 19 May 2009 to Perry L. Everett et al., which patents are incorporated herein by reference.

FIG. 1 is an exploded perspective diagram illustrating the manner in which the components of the present invention, generally designated 110, are assembled in relationship to each other. As illustrated, the major components include a base plate 1, access plate 13, teeter bar 11, cam 9, handle 10, and bollards 2 and 3. Also included are bollard wear sleeves 4 and 5, bearing 12, stops 6, 7, and 8, and pivot axis fasteners 3*c*, 14 and 15. Further included are miscellaneous fasteners 2*c*, 4*b*, 5*b*, 10*c*, 10*d* and 15*a*.

Figure 2:
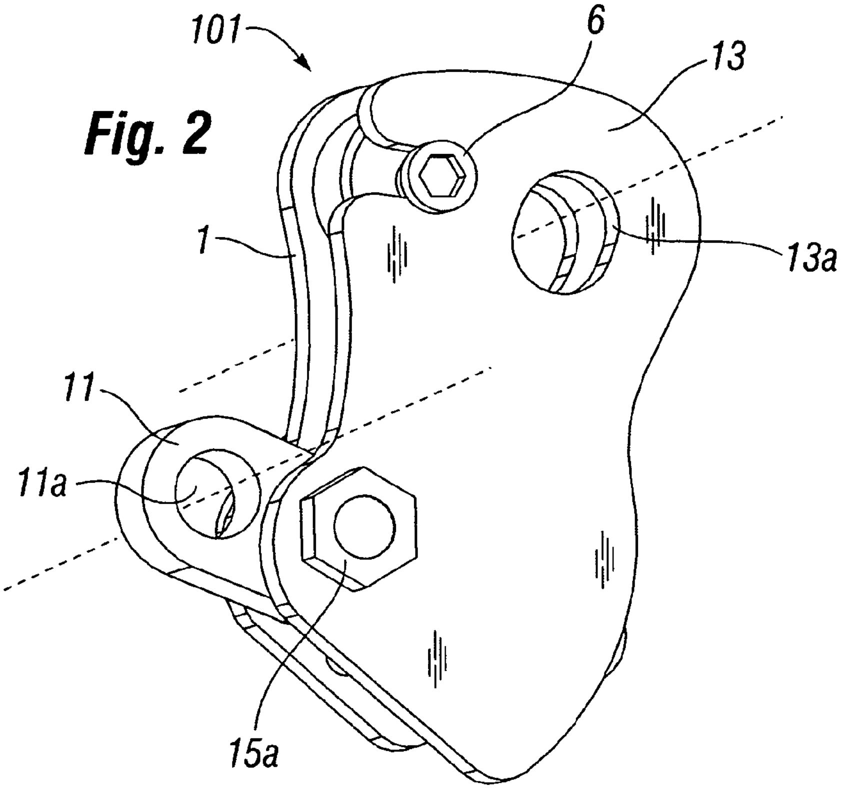
FIG. 2 is a perspective view of the assembled device of FIG. 1 as viewed looking toward the access plate.
Figure 3:
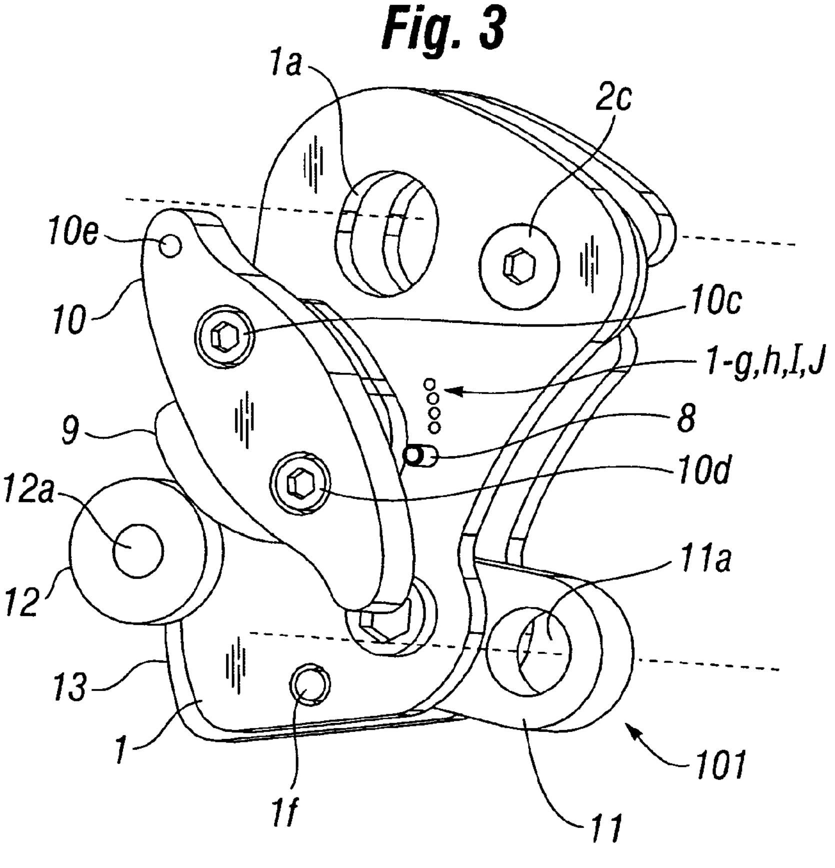
FIG. 3 is a perspective view of the opposite side on the assembled device of the invention of FIG. 1 as viewed looking toward the base plate.
Figure 4:
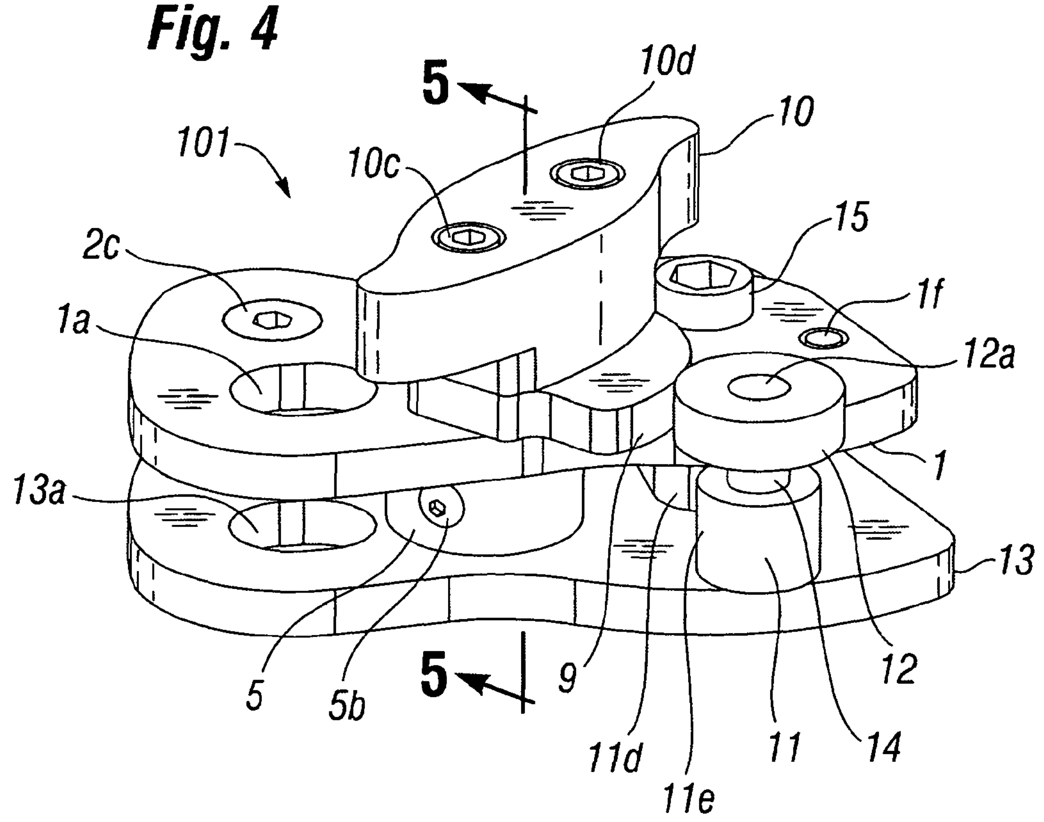
FIG. 4 is a perspective side view of the assembled device of FIG. 1.
Figure 5:
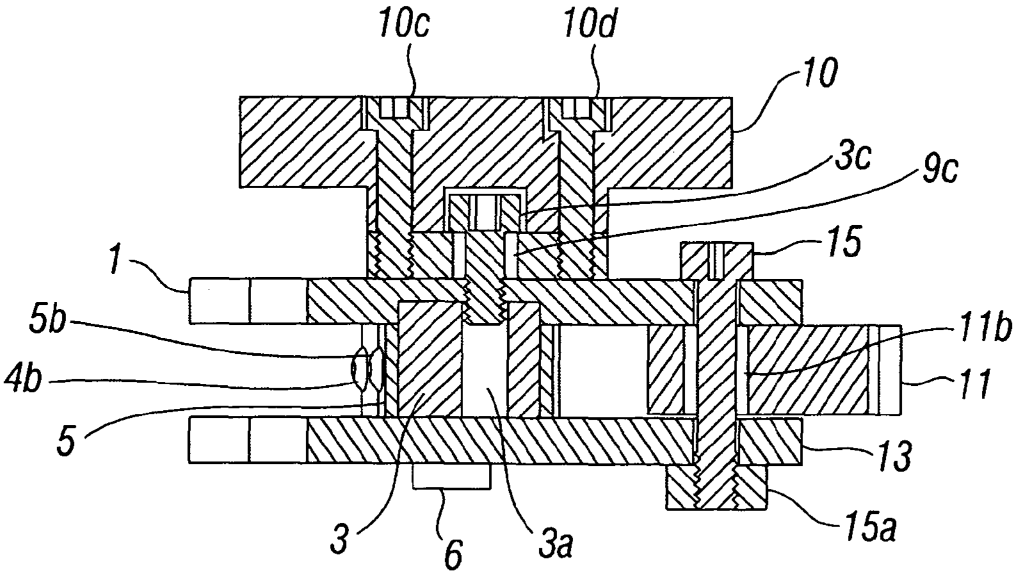
FIG. 5 is a cross-sectional view of the invention taken along lines 5-5 of FIG. 4.

FIG. 2 is a perspective view of the assembled device of FIG. 1 as viewed looking toward the access plate, FIG. 3 is a perspective view of the opposite side of the assembled device of the invention of FIG. 1 as viewed looking toward the base plate, FIG. 4 is a perspective side view of the assembled device of FIG. 1, and FIG. 5 is a cross-sectional view of the invention taken along lines 5-5 of FIG. 4. After assembly of the device 110 as indicated in FIGS. 1-4, there are three component pivot axis' designated as 50, 60, and 70 for pivot axis 1, pivot axis 2 and pivot axis 3, respectively. Pivot axis 50 is defined by aligned pivot holes 1*b*, 11*b* and 13*b* secured by fastener 15 and nut 15*a*, pivot axis 60 defined by bearing pivot hole 12*a* and teeter bar pivot hole 11*c* and secured by fastener 14, and pivot axis 70 defined by aligned pivot holes 9*c* and 1*d* and secured to bollard 3 by fastener 3*c*. There are two rope attachment points, one at teeter bar attachment hole 11*a*, and the other defined by base plate attachment hole 1*a* and access plate attachment hole 13*a*. The rope attachment points are indicated by dotted lines in certain drawings.

As indicated in the drawings the components of the invention and their assembly are described as follows:

a base plate 1 having an attachment hole 1*a*, pivot hole 1*b*, and eight fastener holes 1*c*, 1*d*, 1*e*, 1*f*, 1*g*, 1*h*, 1*i* and 1*j*; hole 1*c* for receiving threaded fastener screw 2*c* therethrough to permanently fasten bollard 2 to base plate 1 by engagement with threaded hole 2*a* of bollard 2; hole 1*d* for receiving fastener bolt 3*c* therethrough to fasten bollard 3 to base plate 1, holes 1*e*, 1*g*, 1*h*, 1*i*, and 1*j* for selectively affixing stop 8, and threaded hole 1*f* for permanently affixing threaded stop 7;

bollards 2 and 3 include fastener holes 2*a* and 3*a*, respectively, for receiving securing fasteners 2*c* and 3*c*, respectively, to affix bollards 2 and 3 to base plate 1, and replaceable wear sleeves 4 and 5 for receiving bollards 2 and 3 respectively and secured to bollards 2 and 3 respectively by screws 4*b* and 5*b*, respectively, threaded hole 2*a* also permanently affixing threaded stop 6 to the bottom of bollard 2;

a cam 9 having a pivot hole 9*c* for receiving threaded fastener 3*c* therethrough after which threaded fastener 3*c* mates with holes 1*d* and 3*a* to secure bollard 3 to base plate 1 and thereby define pivot axis 70, and fastener holes 9*a* and 9*b* for securing handle 10 to cam 9 by means of fastener bolts 10*c* and 10*d*, respectively, and fastener hole 9*d* for securing spring 9*e* by means of fastener screw 9*f*;

a teeter bar 11 pivotally mounted between base plate 1 and access plate 13 by threaded fastener 15 which transits pivot holes 1*b*, 11*b* and 13*b* to terminate in nut 15*a* to thereby define pivot axis 50, attachment hole 11*a* defining a first rope attachment point, a friction brake generally designated 11*d*, and a fairlead generally designated 11*e* having a fastener hole 11*c*;

bearing 12 having hole 12*a* for fixedly receiving a first end of fastener 14, the second end of fastener 14 fixedly received by teeter bar hole 11*c*, this arrangement allowing bearing 12 to remain in contact with cam 9, the combination of bearing 12, fastener 14 and hole 11*c* defining pivot axis 60;

access plate 13 having rope attachment hole 13*a*, pivot hole 13*b* for receiving fastener 15, and co-acting with fastener 15 and pivot hole 11*b* to rotatably affix teeter bar 11 to access plate 13, hole 13*a* co-acting with hole 1*a* to define a first rope attachment point, and catch 13*c* configured for co-acting with threaded stop 6;

handle 10 permanently affixed to cam 9 by threaded fasteners 10*c* and 10*d* transiting holes 10*a* and 10*b*, respectively, to engage threaded holes 9*a* and 9*b*, respectively.

Figure 6A:
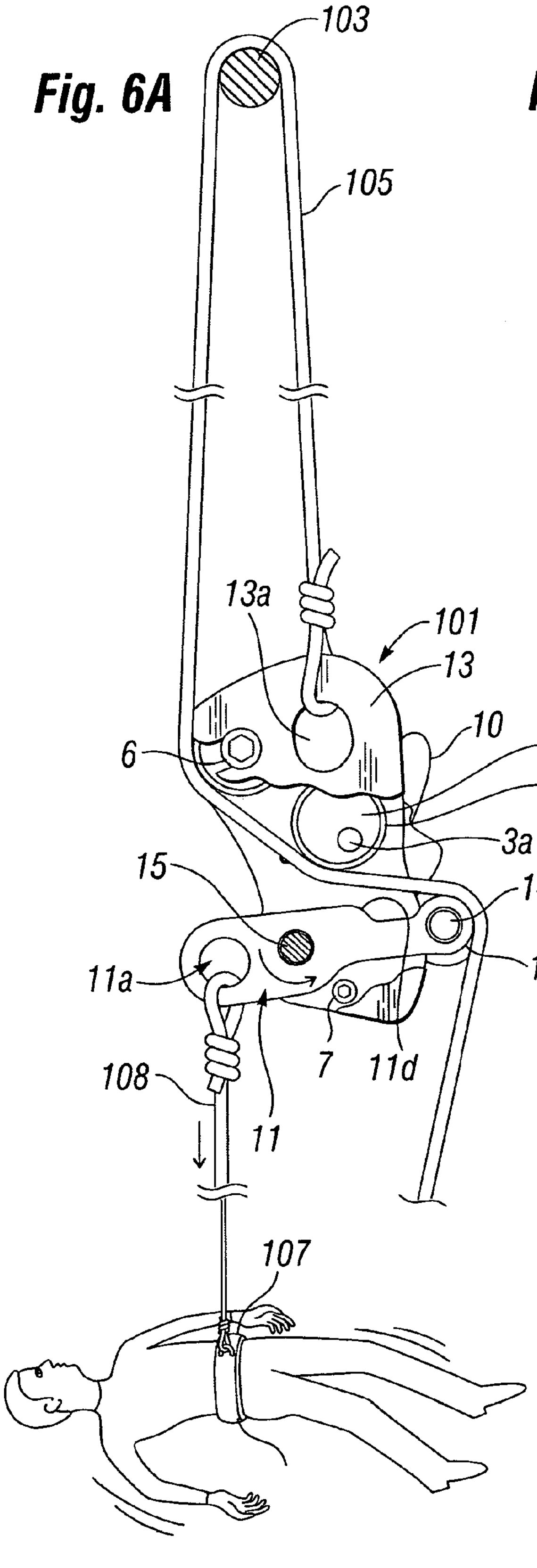
FIG. 6A illustrates operation of the device of the invention approaching a clamping position under load.
Figure 6B:
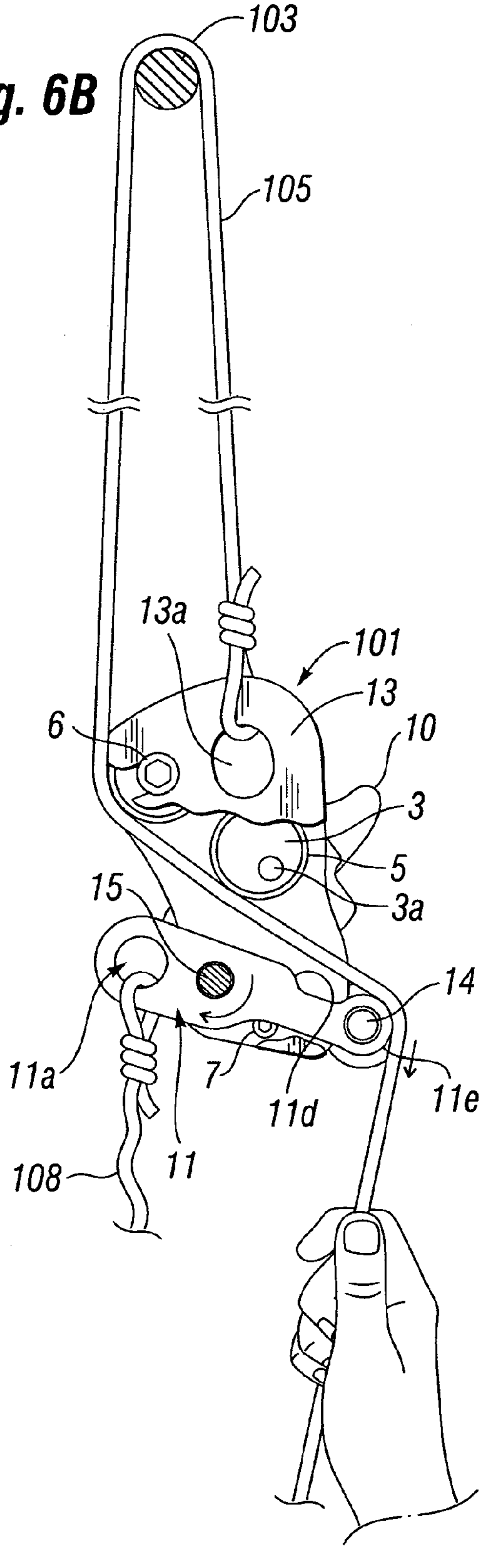
FIG. 6B illustrates operation of the device of the invention wherein the device is in an unclamping position.

FIGS. 6A and 6B illustrate an operational configuration for the invention. FIG. 6A shows tether line 108 attached at one end to a first attachment point defined by hole 1*a* and the other end to security belt 107 shown to be attached to a fellow climber. Rope 105 is shown in FIG. 6B attached at one end to a second attachment point defined by hole 13*a* and then passed around an anchor 103 and then between base plate 1 and access plate 13 positioned to pass bollards 2 and 3 and then around fairlead 11*e* and out of the rope management device 101 for manual control by the device operator. With this configuration it is possible for the operator, by pulling or letting off on the rope 105, to control the distance between pivot axis 70 (hole 1*d* of base plate 1) and pivot axis 60 (hole 11*c* of teeter bar 11) to thereby control the distance between bollard 3 and friction brake 11*d*. With this control the device 101 can be operated to go from a rope clamping state to an unclamping state even when under load.

As shown in FIG. 1, teeter bar 11 is pivotally mounted between base plate 1 and access plate 13 on pivot axis 50, thus allowing teeter bar 11 to teeter about pivot axis 50. As indicated in FIGS. 6A and 6B, when a load is applied to the attachment point defined by hole 11*a* teeter bar 11 teeters about pivot axis 50 to move fairlead 11*e* toward bollard 3 and thus moving pivot axis 60 and pivot axis 70 closer together to apply clamping pressure and friction on a section of rope 105 between wear sleeve 5 of bollard 3 and friction brake 11*d* of teeter bar 11. As the applied load increases, applied clamping pressure and friction increases and holds the load by preventing movement of rope 105 through the device 101.

As is evident from review of the figures, pivot hole 11*b* is in an off center location between attachment hole 11*a* and fairlead 11*e* of teeter bar 11 which provides a leverage advantage. The distance between fairlead 11*e* and pivot axis 50 is greater than the distance between attachment hole 11*a* and pivot axis 50. This leverage advantage makes it possible to more easily pull rope 105 through device 101. As rope 105 is pulled down against fairlead 11*e* teeter bar 11 teeters on pivot axis 50 moving pivot axis 60 and pivot axis 70 further apart thus eliminating clamping pressure and friction on rope 105 between wear sleeve 5 of bollard 3 and friction brake 11*d* of teeter bar 11. This unclamping action allows rope 105 to be pulled through device 101, and down across fairlead 11*e* thus moving device 101 closer to anchor 103.

In operation of the device 101, co-action between handle 10, cam 9 and bearing 12 provides a mechanical advantage in that this co-action makes it possible to more easily control the distance between pivot axis 60 and pivot axis 70. This allows a controlled distance between wear sleeve 5 and friction brake 11*d* which makes it possible for rope management device 101 to go from a rope clamping position to a rope unclamping position even when under load. As handle 10 and cam 9 are turned counter clockwise on pivot axis 70, bearing 12 follows cam 9 to move pivot axis 60 and pivot axis 70 further apart thereby reducing clamping pressure and friction on rope 105 between wear sleeve 5 of bollard 3 and friction brake 11*d* of teeter bar 11. This unclamping action allows rope 105 to slip through device 101 at a controlled speed moving device 101 further from anchor 103.

Further, threaded fastener hole 9*d* of cam 9, when receiving threaded governor control screw 9*f* through governor spring 9*e* together with base plate fastener holes 1*g*, 1*h*, 1*i*, 1*j* and governor stop bolt 10*f*, provides a variable position stop. This provides means for limiting the descent speed of device 101 by limiting how far handle 10 and cam 9 are allowed to turn counter-clockwise before being stopped by governor stop bolt 10*f* and governor control screw 9*f*.

Although the present invention has been described with reference to an illustrated and described embodiment, other modifications and embodiments can be devised by those skilled in the art that would fall within the spirit and scope of the invention.

What is claimed is:

1. A rope management device comprising;

a base plate having a first attachment hole, a first pivot hole, and eight fastener holes, a first hole of said eight fastener holes for receiving a threaded fastener screw therethrough to permanently fasten a first bollard to a first side of the base plate by engagement with a threaded hole disposed in the first bollard, a second hole of said eight fastener holes for receiving a fastener bolt therethrough to fasten a second bollard to the first side of the base plate, a third hole of said eight fastener holes for permanently affixing a threaded stop, with a remaining five holes of said eight fastener holes for selectively affixing an unthreaded stop;

said first and second bollards each include a replaceable wear sleeve secured by respective screws, said threaded hole disposed in the first bollard also permanently affixing a threaded stop to the bottom of said first bollard;

a cam having a second pivot hole for receiving the fastener bolt therethrough after which the fastener bolt transits said second hole of said eight fastener holes and mates with a threaded hole in said second bollard to secure said second bollard to said base plate and thereby define a first pivot axis, and first and second fastener holes for securing a handle to the cam by means of first and second fastener bolts;

a teeter bar having a third pivot hole and pivotally mounted between said base plate and an access plate by a threaded fastener bolt which sequentially transits said first pivot hole, said third pivot hole and a fourth pivot hole located in said access plate to terminate in a nut to thereby define a second pivot axis, a second attachment hole defining a first attachment point, a friction brake and a fairlead, said fairlead having a fastener hole;

a bearing having a hole for fixedly receiving a first end of a second fastener, the second end of said second fastener fixedly received by the fairlead fastener hole, this arrangement allowing said bearing to remain in contact with said cam, the combination of said bearing, said second fastener and said fairlead fastener hole defining a third pivot axis; and said access plate having a third attachment hole, said fourth pivot hole and a catch, said fourth pivot hole co-acting with said threaded fastener bolt and said third pivot hole to rotatably affix said teeter bar to said access plate, said third attachment hole co-acting with said first attachment hole to define a second attachment point, and the catch configured for co-acting with a threaded stop.

2. The rope management device in accordance with claim 1 wherein the teeter bar is pivotally mounted between the base plate and the access plate thus allowing the teeter bar to teeter about said second pivot axis such that when a load is applied to said first attachment point, said teeter bar moves the fairlead toward said second bollard thus moving said second pivot axis and said first pivot axis closer together to apply clamping pressure and friction on a section of rope between the wear sleeve of said second bollard and the friction brake of the teeter bar whereby as the applied load increases the corresponding clamping pressure and friction increases and holds the load by preventing movement of the rope through the device.

3. The rope management device in accordance with claim 1 wherein the handle, the cam and the bearing co-act to provide means for controlling the distance between the third pivot axis and the first pivot axis thereby to allow a controlled distance between the wear sleeve of said second bollard and the friction brake which provides for the rope management device to go from a rope clamping position to a rope unclamping position even when under load, the handle and the cam are turned counter clockwise on said first pivot axis, the bearing follows the cam to move said third pivot axis and said first pivot axis further apart thereby reducing clamping pressure and friction on the rope between the wear sleeve of said second bollard and the friction brake of the teeter bar whereby the resulting unclamping action allows the rope to slip through the device at a controlled.

4. A rope management device comprising;

a base plate, first and second bollards, a cam, a teeter bar, a bearing, an access plate and a handle;

said cam is mounted between a second side of said base plate and a first side of said handle and includes a first pivot axis;

said base plate having said first and second bollards mounted to a first side thereof and a first rope attachment hole;

said teeter bar mounted between a first side of said base plate and the first side of said access plate and having a second rope attachment hole, a second pivot axis, a fairlead, and a friction brake;

said bearing and said fairlead defining a third pivot axis;

said access plate includes a third rope attachment hole: and wherein when a load is applied to said second attachment hole the teeter bar teeters about the second pivot axis to move the fairlead toward the second bollard to apply clamping pressure on a section of rope between said second bollard and the friction brake to thereby prevent movement of the rope through the device.

5. The rope management device in accordance with claim 4 wherein the handle, the cam, and the bearing co-act to provide means for controlling the distance between said second bollard and the friction brake to thereby provide for the rope management device to change from a rope clamping position to a rope unclamping position.

* * * * *